July 4, 1939.  I. E. MATHER  2,164,463
RANGE FINDER
Filed Aug. 19, 1937
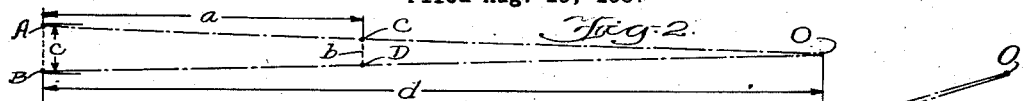
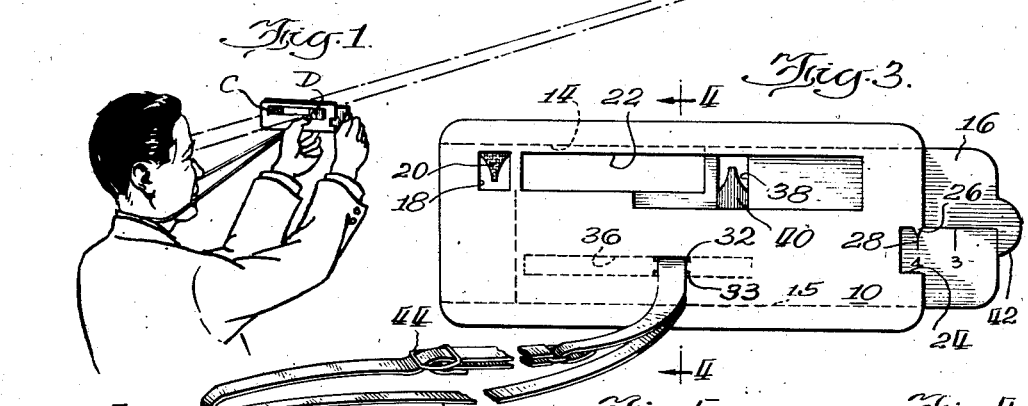
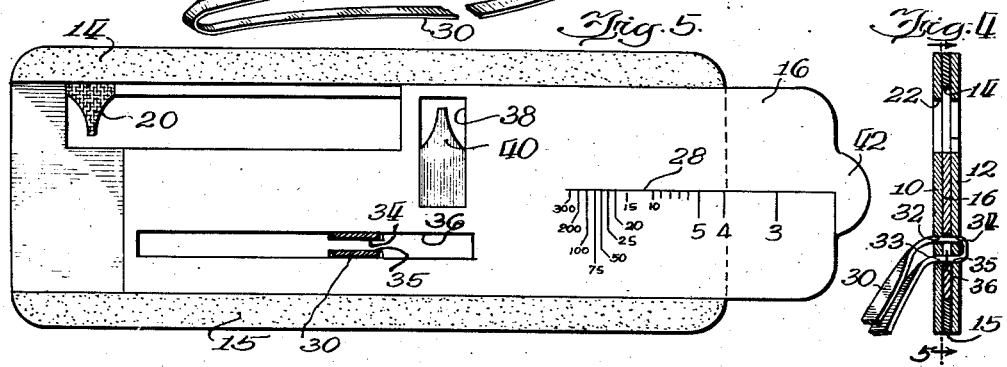
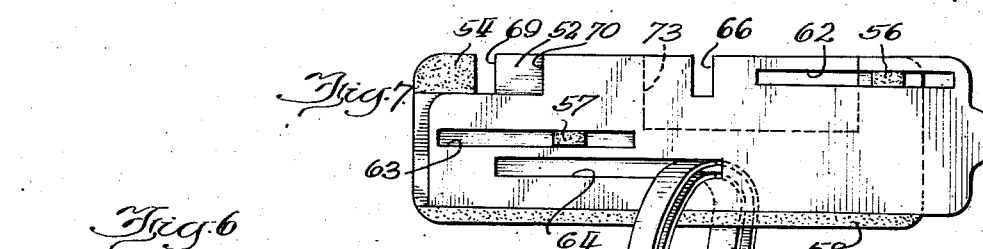
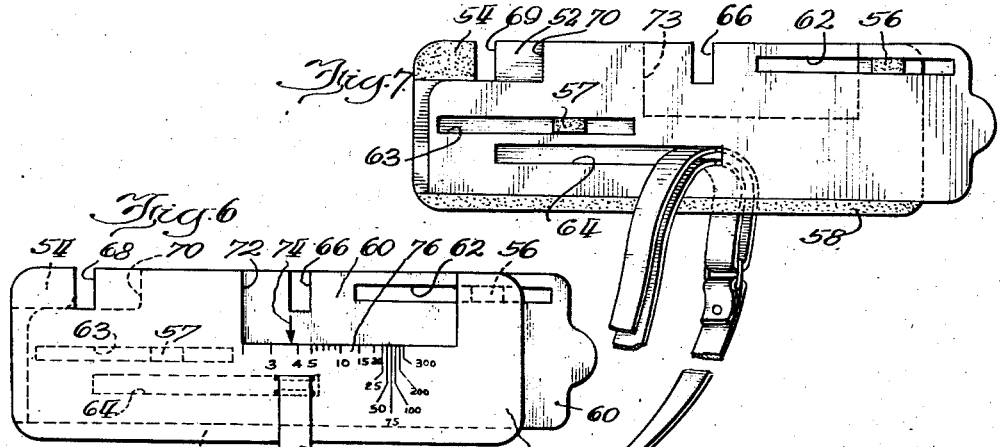
Inventor:
Irwin E. Mather Patented July 4, 1939

2,164,463

UNITED STATES PATENT OFFICE 2,164,463

RANGE FINDER

Irwin E. Mather, Chicago, Ill.

Application August 19, 1937, Serial No. 159,809

7 Claims. (Cl. 33—64)

My invention relates generally to range finders, of simple and economical construction usable by amateur and professional photographers accurately to gauge distances.

In photography, it is important to know quite accurately the distance between the object to be photographed and the lens of the camera so that the camera may be properly focused upon the object. Various types of meters and range finders for this purpose have been proposed and used, but in general the instruments comprise lenses, mirrors, and adjusting devices which not only are rather difficult to use but are necessarily of such high cost as to be unsalable to the average amateur photographer.

It is thus the object of my invention to provide a greatly simplified, relatively cheap range finder by which distances may be determined with an accuracy comparable with that of the focusing apparatus of the ordinary camera.

A further object is to provide a photographic range finder which is very compact and which is simple and easy to operate.

Other objects will appear from the following description, reference being had to the accompanying drawing, in which:

Fig. 1 is a perspective view showing the manner of using the range finder;

Fig. 2 is a geometrical diagram to illustrate the theory of my improved range finder;

Fig. 3 is a front elevation of the range finder;

Fig. 4 is a transverse sectional view taken on the line 4—4 of Fig. 3;

Fig. 5 is a longitudinal sectional view taken on the line 5—5 of Fig. 4;

Fig. 6 is a front elevation of a modified form of my invention; and

Fig. 7 is a longitudinal sectional view of the modified form of Fig. 5, taken just inside the front sheet.

The range finder of my invention operates upon the principle that in looking at an object, the angle of which the object is the apex and which is subtended by the interpupilary distance, is a measure of the distance between the observer and the object. Thus in Fig. 2, A and B represent the left and right eyes respectively of an observer focused upon an object O. If a suitable scale is now interposed between the observer and the object, the line of sight AO of the left eye will intersect the scale at the point C, and that of the right eye will intersect the scale at D. If the distance $a$ between the scale and the eyes of the observer is known, the interpupilary distance $c$ known, and the distance $b$ between C and D determined, the distance $d$ between the observer and the object may easily be computed by the formula: $d = ca/(c-b)$.

The range finder, as best shown in Figs. 3, 4, and 5, comprises a front sheet 10 cemented or otherwise secured to a rear sheet 12 by means of intermediate spacing strips 14 and 15, these parts forming a guide for a slide 16. All of these parts may be made of Celluloid, Bristol board, cardboard, a moulded sheet plastic, or any other similar material, preferably one which may be easily cut and formed and which will form a suitable base upon which indicia may be printed.

The front sheet 10 is provided with a square aperture 18, through which a sight projection 20 formed from the rear sheet 12 is visible. The front sheet 10 also has an elongated generally rectangular opening 22 formed therein, through which the upper portion of slide 16 is visible. A notch 24 is formed at the right hand (Fig. 3) end of the front sheet 10, the notch being formed to provide a pointer 26 cooperable with a scale 28 printed or otherwise marked upon the slide 16.

The slide 16 is conformed to slide freely between the sheets 10 and 12, its movement being limited by a tape 30 which passes through slots 32, 33 formed in the front sheet 10 and corresponding slots 34, 35 formed in the rear sheet 12, and extends through an elongated slot 36 in the slide 16. The slide 16 has a sight opening 38, the opening having sight projection 40. The slide is provided with a tab 42 which projects beyond the right hand ends of the sheets 10 and 12 when the slide is moved to its innermost position.

The ribbon or tape 30 is preferably provided with suitable buckle devices 44 by which its length may be adjusted to compensate for variations in the interpupilary distances of the users.

The range finder is used in the manner illustrated in Fig. 1. The range finder is held between the eyes of the user and the object the range of which is to be ascertained with the ribbon or tape around the neck of the user and determining the distance of the range finder from his eyes. With the eyes focused upon the object, the left eye sights the object by looking through the opening 18 and moving the finder until the point of the sighting projection 20 appears to rest upon some selected point on the object. The slide 16 is then moved until its sighting projection is in the line of sight of the right eye and the selected point on the object. In practice the slide is moved until the sighting projections 20 and 40 appear to be in exact vertical alignment with each other. Under these conditions, the pointer 26 in cooperation with the scale 28 will indicate the number of feet the object is distant from the eyes of the observer.

If the user has difficulty in keeping his eyes focused upon the distant object while adjusting the position of the slide, he may in rapid alternation sight the object with his left eye through aperture 18, keeping his right eye closed, and sight the object with his right eye through aperture 38, keeping his left eye closed. When using the range finder in this manner, it is, of course, very important that the user does not move the range finder or shift his head between alternate sighting operations.

The modification shown in Figs. 6 and 7 comprises front sheet 50 and rear sheet 52, cemented or otherwise suitably secured to separating blocks 54, 56, 57 and strip 58. The sheets 50, 52 are thus spaced to receive a slide 60. The slide 60 has elongated slots 62, 63 embracing the blocks 56, 57 respectively, and a slot 64 to permit movement of the slide with respect to a tape 66 which may be secured to the finder in the manner illustrated in Fig. 7 or in the manner previously described with reference to the structure of Figs. 1, 3, 4, and 5. The slide has a rectangular sighting notch 66, while the front and rear sheets 50, 52 have similar registering sighting notches 68 and 69 respectively.

The slide 60 is cut away at 70 so as not to interfere with the line of sight through notches 68, 69, while the front sheet 50 and rear sheet 52 are provided with large rectangular notches 72, 73 respectively, so that the user may sight through notch 66 irrespective of the position of the slide 60. The slide 60 has an indicating arrow 74 marked thereon for cooperation with graduations of a scale 76 marked upon the face of sheet 50 at the lower edge of the notch 72.

The range finder of Figs. 6 and 7 is used in the same manner as previously described with reference to the embodiment shown in Figs. 1, 3, 4, and 5. Some users find it easier to sight through the open notches 66, 68 than through apertures 18, 38 of the first described embodiment.

It will be apparent to those skilled in the art that the invention may be embodied in various forms. For example, the front and rear sheets may be made of a single integral sheet folded back upon itself. Other similar variations in construction may be made without departing from the principles of the invention as set forth in the following claims.

I claim:

1. In a photographic range finder, the combination of a body member having a sight opening, a slide member movable with respect to said body member and provided with a sight opening, means secured to said body member for determining the distance said members shall be held from the eyes of the user, a pointer on one of said members, and a scale on the other of said members, said scale being graduated to read the distance of an object from the eyes of the user when the user observes said object with the line of sight to one eye passing through the sight opening of said body member, and the line of sight to the other eye passing through the sight opening in said slide member.

2. In a photographic range finder, the combination of means settable to serve as a measure of the angular difference in the direct lines of sight between an object and the two eyes of a user, and a scale on said means for indicating the setting thereof, said scale being calibrated to show directly the distance between said object and the eyes of the user.

3. A range finder comprising a front sheet and a rear sheet, means for securing opposite edges of said sheets together in spaced relation, said sheets having registering elongated slots formed therein, and one of said sheets having a sight projecting into the slot therein, a slide reciprocable in the space between said sheets, said slide having a sight visible through the slots formed in said sheets, and means secured to said sheets for determining the distance said sheet shall be held from the eyes of the user.

4. A range finder comprising a front sheet and a rear sheet, means for securing opposite edges of said sheets together in spaced relation, said sheets having registering elongated slots formed therein, and one of said sheets having a sight projecting into the slot therein, a slide reciprocable in the space between said sheets, said slide having a sight visible through the slots formed in said sheets, cooperative scale means on said slide and one of said sheets, and means secured to said sheets for determining the distance said sheet shall be held from the eyes of the user.

5. In a photographic range finder, the combination of an elongated sheet having a sighting notch formed in one longitudinal edge thereof, a member slidably mounted with respect to said sheet and having a sighting notch in the edge thereof in longitudinal alignment with the notched edge of said sheet, and means to hold said sheet and slide a determined distance from the eyes of the user.

6. In a photographic range finder, the combination of an elongated sheet having a sighting notch formed in one longitudinal edge thereof, a member slidably mounted with respect to said sheet and having a sighting notch in the edge thereof in longitudinal alignment with the notched edge of said sheet, cooperating scale means on said slide and said sheet calibrated to indicate the distance between an object and the eyes of the user when the lines of sight between said object and the eyes of the user pass respectively through said notches, and means to hold said sheet and slide a determined distance from the eyes of the user.

7. A photographic range finer comprising a pair of relatively movable sighting elements, means for determining the distance that said sighting element shall be held from the eyes of the user, and a graduated scale operated by said elements to indicate the distance between an object and the eyes of a user when the lines of sight from said object to the eyes are respectively in line with said sights when the latter are held at said predetermined distance from the eyes

IRWIN E. MATHER.